E. HILKER.
BREAD SLICING BOARD.
APPLICATION FILED AUG. 28, 1911.
1,031,117.
Patented July 2, 1912.
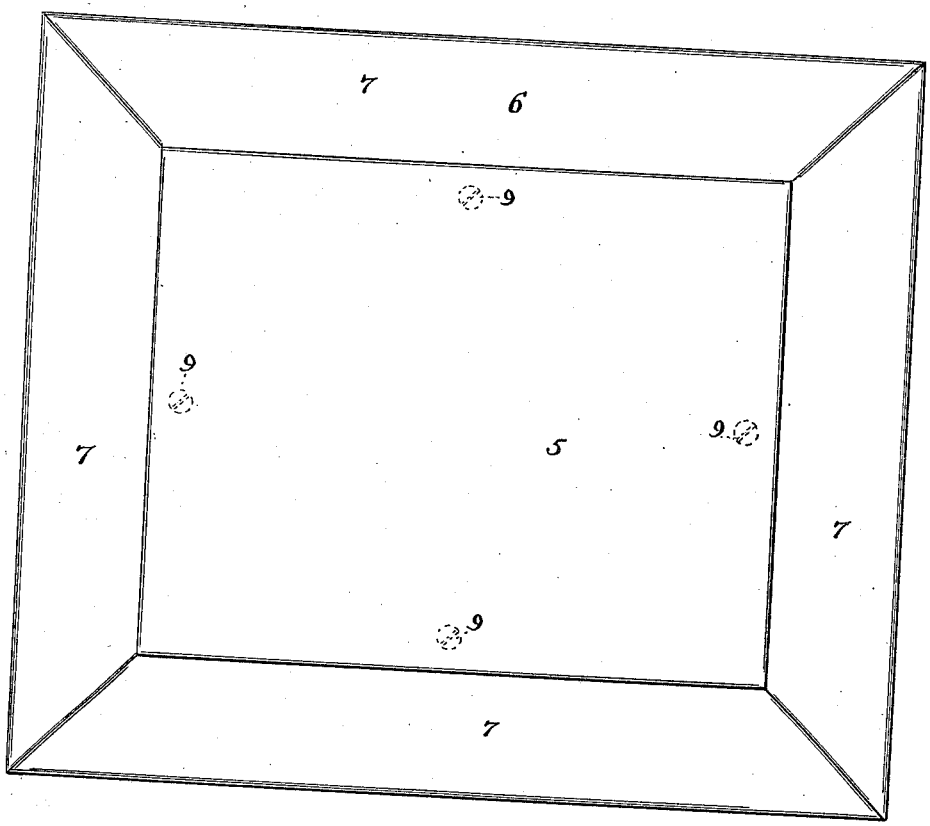
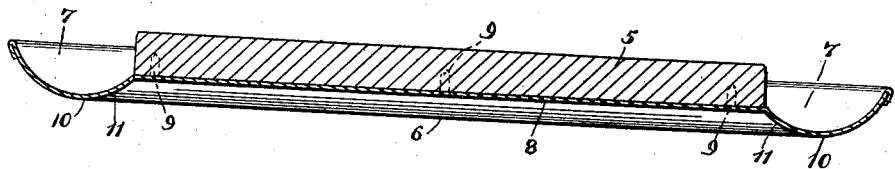
Witnesses:
Chas. E. Gorton
E. Newstrom
Inventor:
Edward Hilker.
By Chas. C. Tillman
Atty.

UNITED STATES PATENT OFFICE.

EDWARD HILKER, OF COLORADO SPRINGS, COLORADO.

BREAD-SLICING BOARD.

1,031,117.  Specification of Letters Patent.  Patented July 2, 1912.

Application filed August 28, 1911. Serial No. 646,444.

*To all whom it may concern:*

Be it known that I, EDWARD HILKER, a citizen of the United States, residing at Colorado Springs, in the county of El Paso and State of Colorado, have invented certain new and useful Improvements in Bread-Slicing Boards, of which the following is a specification.

This invention relates to improvements in a culinary device to be used for supporting on a table loaves of bread while the same are being sliced, and it consists in certain peculiarities of the construction, novel arrangement, and operation of the parts thereof, as will be hereinafter more fully set forth and specifically claimed.

The principal object of the invention is to provide a bread slicing board which shall be simple and inexpensive in construction, strong, durable, and serviceable, and so made that the crumbs incident to cutting the bread will be collected and retained in a trough or receptacle therefor at the perimeter of the board on which the loaf of bread rests, thereby preventing the crumbs falling on the table and becoming scattered thereover.

Another object of the invention is to provide a bread slicing board of such construction that the portion of the board on which the loaf of bread will lie when being cut, will be supported in spaced relation to the table and a somewhat resilient support therefor afforded.

Other objects and advantages of the invention will be disclosed in the subjoined description and explanation.

In order to enable others skilled in the art to which the invention pertains, to make and use the same I will now proceed to describe it referring to the accompanying drawing in which—

Figure 1, is a plan view of a bread slicing board embodying the invention, and Fig. 2, is a longitudinal sectional view of the same.

Like numerals of reference refer to corresponding parts throughout the views of the drawing.

The reference numeral 5, designates a board which may be made of any suitable material, but preferably of wood and rectangular in shape as shown in the drawing. This board is mounted on a base which is designated as a whole by the reference numeral 6, and is preferably made of a piece of slightly resilient material, such as sheet-metal. This base is provided at its edges with a trough 7, which extends entirely around the perimeter of the board 5, and as shown in Fig. 2, of the drawing, the bottom of said trough is downwardly curved below the plane of the body portion 8, of the base, on which body portion the board 5, rests and may be secured thereto by means of screws 9, inserted through suitable openings in the base and seated in the lower surface of said board. By thus depressing or downwardly curving the bottom of the trough 7, it is evident that the bottom 10, of the trough will support the body portion 8, of the base, and the board 5, thereon, at a slight distance from the table on which the board rests so that when slicing the bread the board will yield slightly by reason of the pressure exerted in holding the loaf on the board and slicing the same, which yielding effect is more desirable than if the board were rigidly held, for it is apparent, that by removing the pressure from the loaf and board just before the end of the downward movement of the knife used in cutting the bread, a slight upward movement of the board will be produced, thus causing the knife to make a clean cut incision at the finish of its movement. It is obvious by reference to Fig. 2, of the drawing, that as the trough extends outwardly from the board 5, and has its bottom downwardly curved as before stated, the inclined portions 11, of the floor of the trough will have sufficient resiliency to afford the above named yielding effect. It is also apparent by reference to Fig. 2, of the drawing, that the outer edges of the trough 7, are located below the plane of the upper surface of the board, thus lessening the liability of the knife in the act of cutting the bread from striking the metal portion of the board and becoming dull thereby.

By my improvements, it is manifest that a board embodying the same, can be very cheaply manufactured, for it is evident that the base 6, can be stamped out of suitable metal or other material, and small pieces of wooden boards can be utilized for the boards 5, or bread resting surfaces, which may be secured to the base in any suitable manner, but preferably by means of screws employed as above stated.

Having thus fully described my inven- tion what I claim as new and desire to secure by Letters Patent is—

1. A bread slicing board consisting of a base made of a single piece of slightly resilient material and comprising a flat body portion provided at its edges with an outwardly disposed trough the floor of which is downwardly curved below the plane of said body portion thereby adapted to yieldingly support the said body portion a slight distance above the lowermost portion of the trough, and a board secured to the upper surface of the body portion.

2. A bread slicing board consisting of a base made of a single piece of slightly resilient material and comprising a flat body portion provided at its edges with an outwardly disposed trough the floor of which is downwardly curved below the plane of said body portion thereby adapted to yieldingly support the said body portion a slight distance above the lowermost portion of the trough, and a board secured to the upper surface of the body portion and having its upper surface disposed in a plane above the free edge of the trough.

EDWARD HILKER.

Witnesses:
GRACE HARRISON,
ALFRED R. ALLEN.

Copies of this patent may be obtained for five cents each, by addressing the "Commissioner of Patents, Washington, D. C."